Dec. 26, 1944. H. C. SNOW 2,365,732
CONTROL DEVICE FOR USE ON MOTOR VEHICLES
Filed March 19, 1941 3 Sheets-Sheet 1
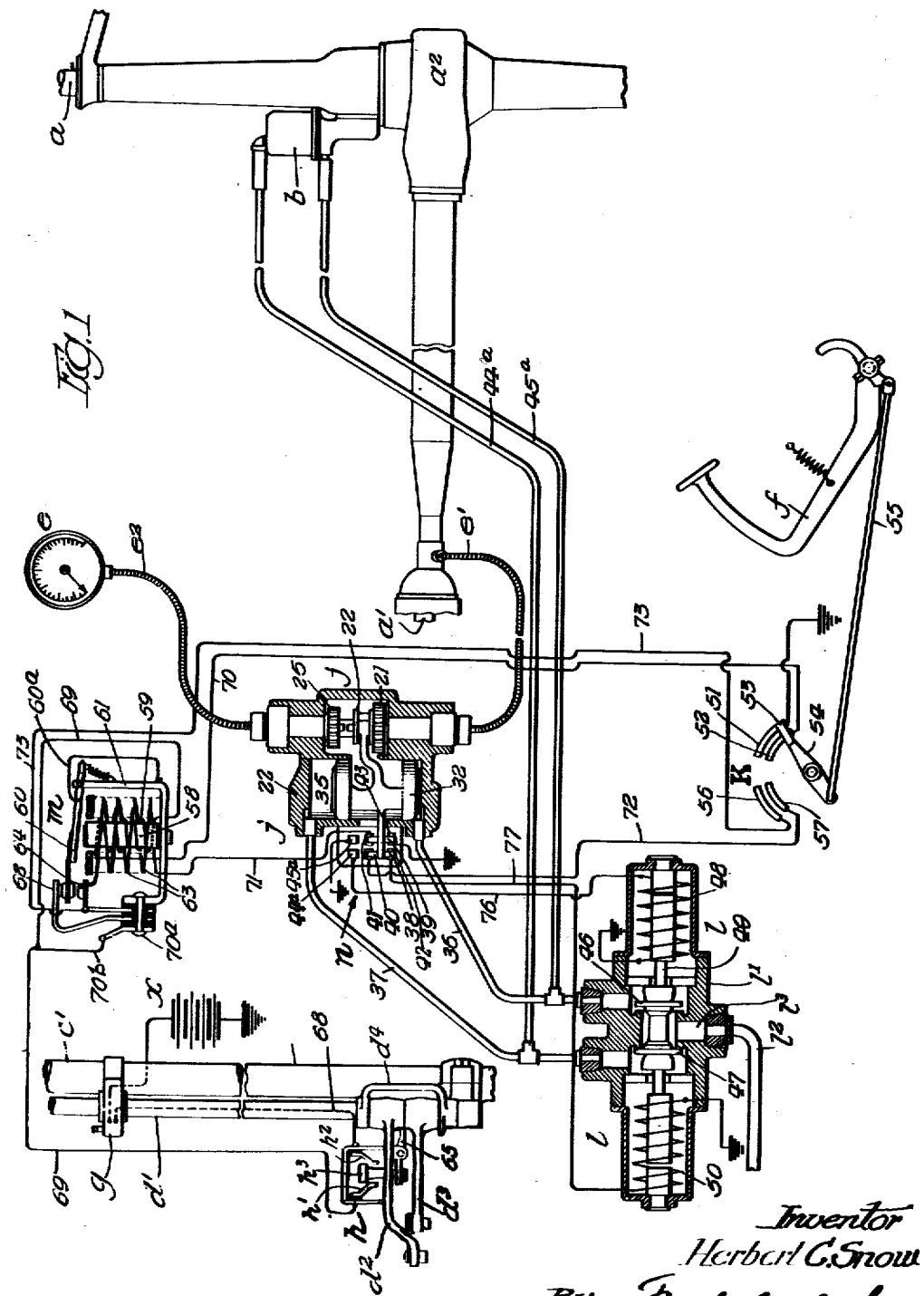
Inventor
Herbert C. Snow
By Fred Gerlach
his Atty

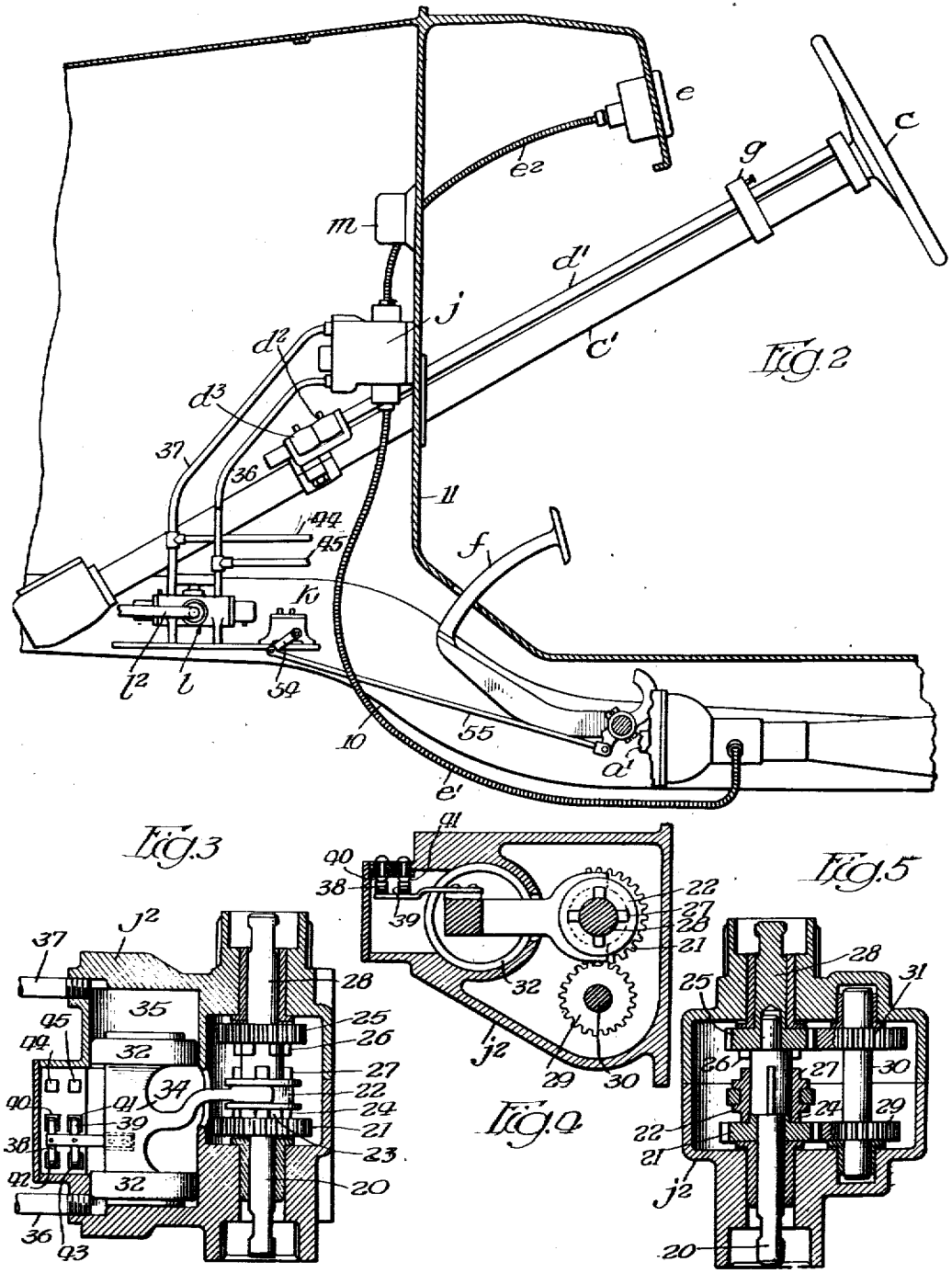

Dec. 26, 1944.   H. C. SNOW   2,365,732
CONTROL DEVICE FOR USE ON MOTOR VEHICLES
Filed March 19, 1941   3 Sheets-Sheet 3
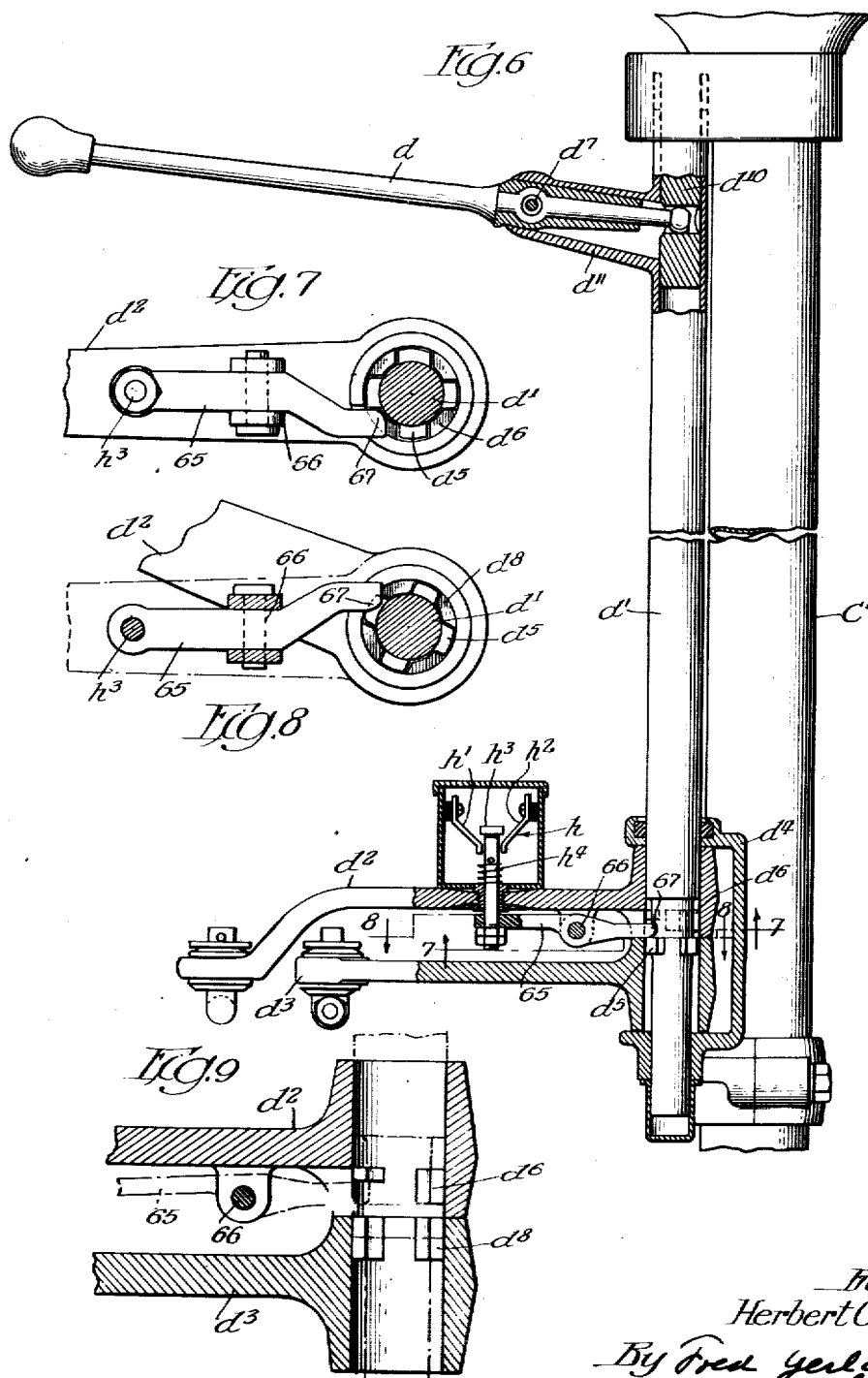

Patented Dec. 26, 1944

2,365,732

UNITED STATES PATENT OFFICE 2,365,732

CONTROL DEVICE FOR USE ON MOTOR VEHICLES

Herbert C. Snow, Kalamazoo, Mich., assignor, by mesne assignments, to The Timken-Detroit Axle Company, Detroit, Mich., a corporation of Ohio Application March 19, 1941, Serial No. 384,223

23 Claims. (Cl. 192—3.5)

The invention relates to devices used on motor-driven vehicles for controlling two-ratio axle gearing and speedometers.

In motor-driven vehicles provided with two-ratio gearing for driving the axles which are driven through the conventional variable speed transmission which is controlled by a gear shift lever, and in which the speedometer is driven from the propeller shaft between the transmission and the two-ratio axle gearing, it is necessary to provide compensating gearing in the speedometer drive mechanism for the changes in relative speed between the vehicle wheels and the propeller shaft by the two-ratio axle gearing.

The objects of the invention are to provide: suction operated devices for controlling the two-ratio axle driving gearing and speedometer drive which are controlled by selective operation of the gear shift lever; control mechanism for the two-ratio axle gearing and the speedometer drive which is effective for change to high ratio only when the gear shift lever is in position for driving the propeller shaft through the transmission at high-speed ratio; control means for the two-speed axle gearing and the speedometer drive which is effective only when the engine is running, the gear shift lever is set for direct drive, and the clutch-pedal is engaged and after the clutch-pedal is disengaged; electromagnetic means for controlling the vacuum for shifting the axle gearing and the speedometer drive; improved suction-controlled mechanism for controlling the two-speed axle gearing; and an improved suction-operable device for shifting the gearing of the speedometer drive.

Other objects of the invention will appear from the detailed description.

The invention consists in the several novel features which are hereinafter set forth and are more particularly defined by claims at the conclusion hereof.

In the drawings:

Fig. 1 is a diagrammatic view of equipment illustrating the devices, electrical circuits and the suction connections for control mechanism embodying the invention; Fig. 2 is a vertical section illustrating the control mechanism mounted on the front portion of a vehicle; Fig. 3 is a vertical section of the adapter for controlling the speedometer for different axle-speed ratios and the switch mechanism controlled by the adapter; Fig. 4 is a sectional view of the adapter, but it is taken on a different plane than that of Figure 3; Fig. 5 is another sectional view of the adapter; Fig. 6 is a view, partly in section, illustrating the gear shift lever for controlling the variable speed transmission and the switch controlled by said lever; Fig. 7 is a section taken on line 7—7 of Fig. 6; Fig. 8 is a section taken on line 8—8 of Fig. 6, one of the arms operable by the gear shift lever being shown in the position assumed when the transmission is set for direct or third-speed driving of the propeller shaft; Fig. 9 is a vertical section through the arms operable by the gear shift lever, the shaft and switch actuating lever being illustrated in dotted lines.

The invention is exemplified for a motor-driven vehicle which is equipped with the usual engine, variable speed transmission for driving the propeller shaft and a clutch between the transmission and the engine, all of which may be of conventional type and are not illustrated. The vehicle includes a conventional frame 10, a body including a dash 11, and a propeller shaft $a'$ which is driven from the conventional three-speed and reverse transmission (not shown). The vehicle also comprises a driving axle $a$, mounted in a housing $a^2$ which is adapted to be driven by two-speed gearing of any conventional type in the housing for driving the axle at different speed ratios from the propeller shaft $a'$ and a vacuum-operable control device $b$ which may be of conventional type for shifting the two-speed gearing to control the speed ratio of the driven axle $a$. The vehicle is also provided with the usual pedal $f$ which is connected to control the clutch for driving the transmission in any conventional manner. A steering wheel $c$ is mounted to rotate in a steering column $c'$. A switch $g$ is provided for controlling the usual ignition system of the engine and is mounted on the steering column. A speedometer $e$ is provided for indicating the speed of travel of the vehicle and usually includes an odometer for recording the distance traveled. A gear shift lever $d$ is connected to control the variable speed transmission in conventional manner. The inner end of lever $d$ is fulcrumed to swing universally in a fixed stud $d^{10}$ and is pivotally connected to an extension $d^{11}$ of the tubular shaft $d'$ for slidably and rotatably shifting said shaft to selectively engage and shift arms $d^2$, $d^3$ for controlling the variable speed and reversible transmission. The upper end of tubular shaft $d'$ is slidable and rotatable in a bracket at the upper end of the steering column $c'$ and its lower end is slidable and rotatable in a bracket $d^4$ which is fixed to the steering column. In its raised position, shaft $d'$ is rotatable by lever $d$ for controlling the transmission gearing for low speed and reverse through arm $d^2$. When shaft $d'$ is lowered by the vertical tilting of lever $d$, it will be positioned to engage and shift arm $d^3$ for controlling the transmission for second and third speed which is usually the direct drive. Shaft $d'$ is provided with a series of splines $d^5$ which, when the shaft is raised, will interfit with splines $d^6$ on arm $d^2$ so that, when the gear shift lever $d$ is swung forwardly, said arm will render operative the reverse drive gearing of the transmission and, when swung rearwardly, will render the low speed drive gearing operable. When shaft $d'$ is lowered by lever $d$, splines $d^5$ will interfit with splines $d^8$ and, when lever $d$ is swung forwardly, will swing arm $d^3$ to render operable the second speed gearing of the transmission and, when lever $d$ is swung rearwardly, shift arm $d^3$ to render operable the transmission for driving at third speed, which is usually a direct drive for the propeller shaft $a'$.

The devices for controlling, by suction, the device $b$ for the two-speed axle gearing and the speedometer drive comprise: A switch $h$ mounted on the arm $d^2$ and controlled by certain manipulation of the gear shift lever $d$, as hereinafter described; a suction-operable adapter $j$ for driving a section $e^2$ of the speedometer drive-shaft at one speed when the low speed axle ratio is used and a correct relatively higher speed when the high speed axle ratio is used, so that the vehicle and distance traveled will be correctly indicated or recorded when either axle ratio is used; a switch $k$ controlled by the movements of the clutch-controlled pedal $f'$ electromagnetically controlled valve mechanism $l$ for controlling the application of suction to the adapter and to the suction control $b$ for the axle gearing; a circuit controlling relay switch $m$; and a switch $n$ controlled by the adapter $j$.

The mechanism $j$ (Figs. 3, 4 and 5) for driving the speedometer $e$ to compensate for the relative variations in the speed of the vehicle wheels when driven by the axle gearing at two ratios and propeller shaft, comprises a casing $j^2$; a shaft-section 20 journaled in the lower end of casing $j^2$ and connected to the section $e'$ of the flexible speedometer drive shaft which is driven by suitable gears (not shown) from the propeller shaft $a'$; a gear 21, loose on the shaft 20; a clutch-collar 22 slidably mounted on and splined to shaft 20 and provided with clutch-teeth 23 for engaging mating clutch teeth 24 on gear 21; a shaft-section 28, journaled in casing $j^2$ and connected to drive the flexible shaft $e^2$ which is connected to drive the speedometer; a gear 25 fixed on the lower end of shaft 28, and provided with clutch-teeth 26 engageable with clutch-teeth 27 on collar 22; a gear 29 meshing with gear 21; a counter-shaft 30 which is journaled in casing $j^2$ and to which gear 29 is fixed; and a gear 31, fixed on shaft 30 and meshing with gear 25. Gears 21, 29, 31 and 25 are adapted to increase the speed ratio of drive shaft-section $e^2$. When the low-speed ratio of axle $a$ is used, collar 22 is clutched to gear 25 and drives shaft-section 28 at the same speed as shaft-section 20 is driven, and gears 21, 29 and 31 will rotate as idlers. When the vehicle wheels and axle $a$ are driven by the high ratio axle gearing, collar 22 will be coupled to gear 21 and drive gear 25 through gear 29, shaft 30 and gear 31. This will increase the speed of shaft-sections 28 and $e^2$ relatively to the shaft-sections 20 and $e'$ by the proper degree to compensate for the change in the speed-ratio of the propeller shaft $a'$ and axle $a$. This exemplifies a gearing for driving the speedometer from the propeller shaft at different speed ratios to compensate for the variation produced by the two-speed axle gearing between the vehicle wheels and the propeller shaft $a$.

Collar 22 is controlled by suction applied to a double-ended piston 32 on a stem 34. This piston is slidable in a cylinder 35 at one side of the casing $j^2$. Suction pipes 36, 37 are connected to the ends of the cylinders, respectively, to operate the piston 32 in opposite directions for shifting collar 22 to drive shaft-sections $e'$, $e^2$ at two different ratios, as aforesaid. When suction is applied to the lower end of cylinder 35 through pipe 36, as hereinafter described, the piston 32 will shift collar 22 to drive shaft-section 22 at a higher ratio than shaft-section 20 and when suction is applied to the upper end of said cylinder through pipe 37, collar 22 will engage and directly drive shaft-section 28 from shaft-section 20. This exemplifies suction-controlled mechanism for controlling the adapter for gearing for driving the speedometer at different speed-ratios from shaft-section $e'$. The piston 32 is also utilized to control switch $n$, which controls the valve mechanism $l$ for the suction control of the adapter $j$ and the device $b$ for controlling the axle gearing as hereinafter described. This switch comprises contact-strips 38 and 39 which are insulated from each other and are fixed to the stem 34 of piston 32 so they will be shifted by the piston; a central pair of contacts 40, 41; a pair of lower contacts 42 and 43; and a pair of upper contacts 44, 45 for controlling circuits, as hereinafter described.

The device $l$ simultaneously controls suction to the cylinder 35 of the adapter $j$ and to the suction-operable device $b$ for shifting the axle gearing and comprises a casing $l'$ which is provided with a central chamber $l^3$ which is in communication with a suction line $l^2$ from the engine manifold. A slidable double valve assembly embodying a valve 46 controls suction from chamber $l^3$ to pipe 36 which is connected to the lower end of cylinder 35 of the adapter $j$ and also, through a T, to a pipe 45ª which is connected to the axle ratio shifting device $b$, for effecting a change of the axle gearing into the high ratio. The valve assembly also comprises a valve 47, connected by a stem 49 to valve 46 and controls suction to pipe 37 which is connected to the upper end of cylinder 35 and also, through a T, to a pipe 44ª which is in turn connected to the device $b$ for shifting the axle gearing into the low ratio. Valves 46 and 47 are adapted to be alternately closed and opened by electromagnetic means. A solenoid 48 is adapted to shift the stem 49 and valves 46 and 47 to the right (Fig. 1) to simultaneously close valve 47 and open valve 46 so as to apply suction to, and move, piston 32 downwardly in cylinder 35 and also simultaneously apply suction to the device $b$, and cause it to shift the axle gearing into high ratio. A second solenoid 50 is adapted to shift stem 49 to the left, so as to simultaneously open valve 47 and close valve 46 for applying suction to the upper end of cylinder 35 to shift piston 32 upwardly, for driving the speedometer $l$ at the low ratio, and also for applying suction simultaneously to pipe 44ª to device $b$ for shifting the axle gearing into low ratio. This device exemplifies electromagnetic means for simultaneously shifting valve means for conjointly controlling the suction-controlled adapter $j$ for the speedometer drive and the suction-operable shifting device for the two-ratio axle gearing. Although the valve means is operable to simultaneously apply vacuum to the controls for the speedometer drive and the axle gearing, it is to be understood that the actual shift of the parts may occur at slightly different times, depending upon the time interval required to synchronize the relatively rotating parts.

The switch $k$ comprises a pair of contacts 51, 52, a contact-strip 53 on a pivoted lever 54, and a pair of contacts 56, 57. Lever 54 is connected by a link 55 to the clutch-pedal $f$ and is adapted to close a circuit across contacts 51, 52 when the clutch-pedal $f$ is positioned to engage the clutch and also during the initial portion of the disengaging stroke. Contact strip 53 closes a circuit across strips 56, 57 when the pedal $f$ is positioned to disengage the clutch. These pairs of contacts are spaced apart to interrupt both circuits when strip 53 is disposed between the clutch-engaging and disengaging positions of the clutch pedal. This exemplifies a switch controlled by the clutch-pedal for controlling the circuits, and which effects a two-stage operation of the solenoids 48, 50, so that pedal $f$ must be in clutch-engaging position when changes in speed-ratio are initiated and in clutch-disengaging position for the completion of said changes.

The relay switch $m$ comprises an inner magnet including a core 58 and a helix 59, and armature 60, which carries a contact strip at its free end, is pivoted to a frame 61 and normally held by a spring in its raised position to engage a stop. This armature controls a circuit through contact 51, strip 53 and contact 52 to ground. This relay also comprises an outer magnet which includes a helix 63 for holding armature 60 in engagement with a contact 64 after the circuit to ground for helix 59 is interrupted at switch $k$. This holding magnet functions to establish circuits for causing the operation of magnets 48 and 50 to control the movements of piston 32 when the clutch-pedal is depressed to releasing position.

The switch $h$ is controlled by the movements of the transmission controlling lever $d$ and comprises a pair of contacts $h'$, $h^2$ and a contact $h^3$ which has a stem $h^4$ slidably mounted in arm $d^2$ and urged upwardly into circuit breaking position by a spring. A lever 65 is fulcrumed at 66 on arm $d^2$ and is provided with an extension 67 which is adapted to be lifted when the shaft $d'$, through which the transmission gearing is controlled, is lifted after lever $d$ has been swung into position to connect the direct or third-speed of the transmission for the propeller shaft $a'$. The inner end of lever 65 extends through a notch in the hub of arm $d^2$. The lower ends of splines $d^6$ on arm $d^2$ are spaced above the lower end of the hub of said arm (Fig. 9) to permit the splines $d^5$ on shaft $d'$ to be lifted into the hub of arm $d^2$ while the splines $d^5$ remain engaged with splines $d^8$ on arm $d^3$, so that the inner end of switch-operating lever 65 may be shifted upwardly by one of the splines $d^5$. When shaft $d'$ has been lowered into the position shown in Fig. 6, splines $d^5$ on said shaft will engage splines $d^8$ for swinging arm $d^3$. Lever 65 is so shaped that in the neutral position of shaft $d'$ (Fig. 7) the splines $d^5$ will clear the inner end of lever 67 during the sliding movements of said shaft so that the splines $d^5$ may be selectively engaged with the splines $d^8$ for operating arm $d^3$ or the splines $d^6$ on arm $d^2$. When shaft $d'$ is in its neutral position and is shifted downwardly to the position shown in Fig. 6, arm $d^3$ will be engaged by the shaft for selective swinging movement. When it is desired to drive the propeller shaft $a$ at third speed or direct drive, the operator will lower shaft $d'$, as just described, to engage splines $d^5$ and $d^8$ and then swing lever $d$ rearwardly, which will swing arm $d^3$ to effect the desired change in the transmission. When it is desired to effect a change in the ratio of axle gearing, the operator will then lift lever $d$ a slight distance after arm $d^3$ has been shifted to its third-speed position. This slight upward shift will cause one of the splines $d^5$ on shaft $d'$, which at that time underlies the inner end 67 of lever 65 (Fig. 8), to lift said inner end and rock lever 65 to close switch $h$, as indicated in dotted lines in Fig. 9. When gear-shift lever $d$ is swung forwardly, to place the transmission in second speed, none of the splines $d^8$ will underlie the inner end of lever 67, so that lever 65 will not be operable to close switch $h$ by the lifting of shaft $d'$. When shaft $d'$ is raised into position to interfit with splines $d^6$ and arm $d^3$ is shifted to engage either the reverse or first speed gearing of the transmission, lever 65 will swing with arm $d^2$ and will not be operable to close switch $h$ by the splines $d^5$ on shaft $d'$, one of the splines $d^6$ being cut away as seen in Fig. 9 so as to provide a clearance and permit free swinging movement of the inner end of lever 65. This exemplifies a switch for controlling the operation of the two-ratio axle gearing and speedometer drive which is controlled by an additional upward selective movement of the gear shift lever for the transmission, and also one which is operable only after the gear shift lever has been shifted to render operative the third-speed drive of the transmission.

The switches $h$, $m$, $n$ and $k$ are electrically connected, as illustrated in Fig. 1.

The operation will be as follows: assuming the axle $a$ and vehicle wheels are being driven from the propeller shaft by the low ratio axle gearing, valve 47 will be open and valve 46 will be closed. The piston 32 will be raised in cylinder 35 and clutch-collar 22 will be coupled to gear 25 and will drive shaft-sections 28 and $l^2$ at the same speed as flexible shaft $l^1$ is driven from the propeller shaft $a'$. The suction control $b$ will be set so that the gearing associated with axle $a$ will drive the axle at low speed. While the valves 46, 47 and piston 32 of adapter $j$ remain in this position, the control lever $d$ may be shifted to operate arms $d^2$, $d^3$ to selectively control the conventional variable speed transmission for driving the axle $a$ at first, second or third speeds or in reverse, by pivotal and sliding movement of lever $d$, as well understood in the art, without producing any change by suction in the adapter $j$ or in the controller $b$. Switch $h$ carried by arm $d^2$ is normally open. When shaft $d'$ has been raised to engage splines $d^5$ with the splines $d^6$ on arm $d^2$, switch-operating lever 65 will lie in between two of the splines $d^5$ (Fig. 7) for switch $h$ so that lever $d$ may be operated to set the transmission for low-speed or reverse driving without closing switch $h$. When shaft $d'$ is lowered to engage its splines $d^5$ with splines $d^8$ on arm $d^3$, the splines $d^5$ will be below the inner end of lever 65. When shaft $d'$ is rotated while the splines $d^5$ are lowered by forward movement of gear shift lever $d$ for driving the propeller shaft $a'$ through the second-speed gearing of the transmission, the inner end of lever 65 will be vertically aligned with a space between splines $d^5$ so that lever 65 can not be rocked vertically by shaft $d'$ to open switch $h$. When lever $d$ is shifted to lower splines $d^5$ into engagement with splines $d^6$ and swung rearwardly for driving the propeller shaft $a'$ from the transmission at third-speed, one of the splines underlies the inner end 67 of lever 65. This occurs only when lever $d$ is set for third-speed or direct driving. When the operator desires to change the driving ratio of the two-speed axle gearing, the gear shift lever will be in position for driving at third-speed and arm $d^3$ will have been shifted so one of the splines $d^5$ will underlie the end 67 of switch-lever 65. He will lift lever $d$ slightly to raise shaft $d'$ and splines $d^5$ so one of them will lift the inner end 67 of, and vertically rock lever 65 and close switch $h$. The splines $d^6$ in arm $d^2$ terminate slightly above the inner end of the hub of arm $d^2$, as seen in Fig. 9, to permit the splines $d^5$ to pass into said hub a distance sufficient to actuate lever 67 without engaging splines $d^6$. By this means the switch $h$ is controlled by the gear shift lever $d$ for the transmission and said switch is operable only when lever $d$ is set for direct drive or third-speed control. One of the contacts of switch $h$ is connected by a conductor 68 to the ignition switch $g$ so that said switch will not close the circuits which it controls unless the ignition switch is closed and the engine is running.

When the operator selectively closes switch $h$ in the manner just described, the following circuit will be established if the clutch-pedal $f$ is in clutch-engaging position as shown in Figure 1: battery $x$, ignition switch $g$, contacts $h^2$, $h^3$, $h'$ of switch $h$, conductor 69, helix 59, around core 58, conductor 70 and contacts 52, 53, 51 to switch $k$ to ground. This circuit will shift armature 60 to engage terminal 64. When armature 60 engages contact 64 the following circuit will be established through the helix 63 of the holding magnet for holding armature 60 in engagement with contact 64 when the clutch-pedal $f$ is depressed into clutch-releasing position, viz: conductors 69, 70$^b$, frame 61, armature 60, contact 64, conductor 71, contact 41, strip 39 and contact 45, to ground. Next, while holding switch $h$ closed, in the manner previously described, the clutch-pedal $f$ will be depressed to disengage the clutch for effecting the changes in the speed-ratios of the axle gearing and the adapter $j$. As the clutch-pedal $f$ is depressed it will, first, through link 55, rock arm 54 to move contact-strip 53 off contacts 51, 52, which will interrupt the circuit through helix 59 while armature 60 remains held in engagement with contact 64 by the holding magnet 63. When the clutch-pedal $f$ has been depressed to clutch-releasing position, contact 53 will span contacts 56, 57 and close the following circuit for energizing the solenoid 48: conductors 69, 70$^b$, post 70$^a$, frame 61, conductor 60$^a$, armature 60, contact 64, conductor 73, contacts 56, 53, 57, conductor 72, contact 40, strip 38, contact 44, conductor 76, and the helix of solenoid 48, to ground. This will close valve 47 and open valve 46 and connect suction line $l^2$ to pipes 36 and 45. The suction will shift piston 32 downwardly and simultaneously operate the suction-controlled device $b$ to shift the axle gearing for high-ratio driving and will couple clutch-collar 22 to gear 21 to drive the shaft-sections 28 and $e^2$ through gears 29, 31 and 25 at the proper higher speed to indicate the vehicle speed while it is driven from the propeller shaft $a'$ by the high-ratio gearing in the axle housing. During the shift of piston 32, the circuit through helix 63 to ground will be momentarily broken at strip 39 and contact 45 to de-energize said helix and release armature 60 and interrupt the circuit for the holding magnet at contact 64, so that when the strips 38 and 39 have been shifted by piston 32, the circuits through armature 60 and contact 64 can not be again closed until the clutch-pedal is re-engaged and again depressed while the gear shift lever is shifted to close switch $h$. This prevents a second shift of the piston 32 until after the clutch-pedal has been re-engaged and switch $h$ is again closed by the operator. When piston 32 has been shifted to the lower end of cylinder 35, switch-strips 38 and 39 are simultaneously shifted so that while the axle is being driven at high-ratio the adapter switch $n$ will be in position for next effecting the suction control from high to low speed-ratio.

When the control devices are in high-ratio position and it is desired to operate control device $b$ and the speedometer $e$ for low ratio, the adapter $j$ will be in position illustrated in Fig. 1. The operator will then close switch $k$, as before described, by the selective operation of lever $d$, while arm $d^3$ is in position for direct or third-speed driving of the propeller shaft $a'$. This will close the circuit before described through helix 59 and switch $k$ to shift armature 60 and close the circuit for the helix 63 of the holding magnet until the clutch-pedal $f$ is depressed to clutch-releasing position. When that is done, the following circuit will be established for energizing the helix of solenoid 50 to close valve 46 and open valve 47, viz: conductor 70$^b$, post 70$^a$, frame 61, conductor 60$^a$, armature 60, contact 64, conductor 73, contacts 56, 53, 57, conductor 72, contact 40, strip 38, contact 42, conductor 77 and the helix of solenoid 50, to ground. Suction will then be applied through pipe 37 to cylinder 35 to lift piston 32 and to pipe 44 to shift the control device $b$ for low-ratio. The suction-controlled piston 32 and switch $n$ will then be positioned in readiness for a change from low to high speed ratios when the gear shift lever $d$ is selectively operated as before described.

The suction-controlled device described for the two-ratio axle drive and the speedometer drive, are selectively controlled by the gear shift lever which controls the conventional three-speed and reverse transmission of the vehicle. The suction-controlled devices are effective to change the speed-ratios of the axle and the speedometer only when the engine is running to provide suction, the gear shift lever is in direct drive position and is given an additional lifting movement, and the clutch is engaged and after the clutch is disengaged. The adapter for the speedometer drive is controlled by suction and, upon operation of the piston for one ratio, it is in pre-selected position for the other ratio. The valve-means for controlling the suction is electromagnetically controlled by switches including a switch selectively operable by the gear shift lever, the clutch-pedal and said piston. The relay-switch functions to maintain a circuit for operating the electromagnetic means until the clutch-pedal is depressed to complete the changes in speed-ratios.

The invention is not to be understood as restricted to the details set forth, since these may be modified within the scope of the appended claims, without departing from the spirit and scope of the invention.

Having thus described the invention, what I claim as new and desire to secure by Letters Patent is:

1. In control mechanism for a speedometer and a multi-speed axle driven from the propeller shaft of a vehicle equipped with a variable speed transmission selectively controlled by a gear shift lever, the combination of a speedometer drive shaft-section, two-speed gearing driven by said propeller shaft for driving said shaft-section, a speedometer driven by said two-speed gearing, suction-operable means for controlling the gearing to drive said shaft-section at different speed ratios, valve-means for controlling the suction to said control means, electromagnetic means for controlling the valve-means, and means for manually and selectively controlling the electromagnetic means comprising a switch controlled by the gear shift lever.

2. In control mechanism for a speedometer and a multi-speed axle driven from the propeller shaft of a vehicle equipped with a variable speed transmission selectively controlled by a gear shift lever, the combination of a speedometer and a speedometer drive shaft-section, two-speed gearing driven by said propeller shaft for driving said shaft-section, suction-operable means for controlling the gearing to drive said shaft-section at different speed ratios, valve-means for controlling the suction to said control means, electromagnetic means for controlling the valve-means, and means for manually and selectively controlling the electromagnetic means comprising a manually and selectively operable switch, and a second switch controlled by the suction-controlled means.

3. In control mechanism for a speedometer and a multi-speed axle driven from the propeller shaft of a vehicle equipped with a variable speed transmission selectively controlled by a gear shift lever, the combination of a speedometer and a speedometer drive shaft-section, two-speed gearing driven by said propeller shaft for driving said shaft-section, suction-operable means for controlling the gearing to drive said shaft-section at different speed ratios, valve-means for controlling the suction to said control means, electromagnetic means for controlling the valve-means, and means for manually and selectively controlling the electromagnetic means comprising a manually and selectively operable switch, a second switch controlled by the suction controlled means, and a pedal-controlled switch.

4. In control mechanism for a speedometer and a multi-speed axle driven from the propeller shaft of a vehicle equipped with a variable speed transmission selectively controlled by a gear shift lever, the combination of a speedometer and a speedometer drive shaft-section, two-speed gearing driven by said propeller shaft for driving said shaft-section, suction operable means for controlling the gearing to drive said shaft-section at different speed ratios, valve-means for controlling the suction to said control means, electromagnetic means for controlling the valve-means, and means for manually and selectively controlling the electromagnetic means comprising a switch controlled by the gear shift lever, a switch controlled by the suction-controlled means, and a pedal-controlled switch.

5. In control mechanism for a speedometer and a multi-speed axle driven from the propeller shaft of a vehicle, the combination of a speedometer drive shaft-section, a casing, two-speed gearing driven by said propeller shaft and disposed in said casing for driving said shaft-section, a suction-operable piston in said casing for controlling the gearing to drive said shaft-section at different speed ratios, a speedometer driven by said shaft section, valve-means for controlling the suction to shift the piston in opposite directions, electromagnetic means for controlling the valve-means, and means for manually and selectively controlling the electromagnetic means comprising a switch controlled by the piston.

6. In control mechanism for a speedometer and a two-speed axle driven from the propeller shaft of a vehicle, the combination of a speedometer drive shaft-section, two-speed gearing driven by said propeller shaft for driving said shaft-section, a suction-operable piston for controlling the gearing to drive said shaft-section at different speed ratios, a speedometer driven by said shaft section, valve-means for controlling the suction to said piston, electromagnetic means for controlling the valve-means, and means for manually and selectively controlling the electromagnetic means, comprising a hand-lever, a switch controlled by said hand-lever, a switch shiftable by a clutch-pedal, and a switch controlled by suction-controlled means.

7. In control mechanism for a speedometer driven from the propeller shaft of a vehicle equipped with a variable speed transmission selectively controlled by a gear shift lever and suction-controlled two-ratio gearing for driving the axle of the vehicle, the combination of a speedometer and two-speed gearing driven by said propeller shaft for driving the speedometer, suction-operable means for controlling the gearing for driving the speedometer, suction-operable means for controlling the two-ratio gearing for driving the axle, valve-means for controlling the suction to both of said suction-operable means, electromagnetic means for controlling the valve-means, and means for manually and selectively controlling the electromagnetic means comprising a switch controlled by the gear shift lever.

8. In control mechanism for a speedometer driven from the propeller shaft of a vehicle equipped with a variable speed transmission selectively controlled by a gear shift lever and suction-controlled two-ratio gearing for driving the axle of the vehicle, the combination of a speedometer and two-speed gearing driven by said propeller shaft for driving the speedometer, suction-operable means for controlling the gearing for driving the speedometer, suction-operable means for controlling the two-ratio gearing for driving the axle, valve-means for controlling the suction to both of said suction-operable means, electromagnetic means for controlling the valve-means, and means for manually and selectively controlling the electromagnetic means comprising a switch controlled by the gear shift lever, a switch controlled by the means for controlling the gearing for driving the speedometer and a relay switch.

9. In control mechanism for a speedometer driven from the propeller shaft of a vehicle equipped with a variable speed transmission selectively controlled by a gear shift lever, a pedal-controlled clutch through which the transmission is operated and suction-controlled two-ratio gearing for driving the axle of the vehicle, the combination of a speedometer and two-speed gearing driven by said propeller shaft for driving the speedometer, suction-operable means for controlling the gearing for driving the speedometer, suction-operable means for controlling the two-ratio gearing for driving the axle, valve-means for controlling the suction to both of said suction-operable means, electromagnetic means for controlling the valve-means, and means for manually and selectively controlling the electromagnetic means comprising a switch controlled by the gear shift lever, a switch controlled by one of said suction-operable means and a switch controlled by the clutch-pedal.

10. In control mechanism for a speedometer driven from the propeller shaft of a vehicle equipped with a variable speed transmission selectively controlled by a gear shift lever, a pedal-controlled clutch through which the transmission is operated and suction-controlled two-ratio gearing for driving the axle of the vehicle, the combination of a speedometer and two-speed gearing driven by said propeller shaft for driving the speedometer, suction-operable means for controlling the gearing for driving the speedometer, suction-operable means for controlling the two-ratio gearing for driving the axle, valve-means for controlling the suction to both of said suction-operable means, electromagnetic means for controlling the valve-means, and means for manually and selectively controlling the electromagnetic means comprising a switch controlled by the gear shift lever, a switch controlled by one of said suction-operable means, a relay switch, and a switch controlled by the clutch-pedal.

11. In control mechanism for a speedometer driven from the propeller shaft of a vehicle equipped with a variable speed transmission selectively controlled by a gear shift lever and suction-controlled two-ratio gearing for driving the axle of the vehicle, the combination of a speedometer and two-ratio gearing driven by said propeller shaft for driving the speedometer, a casing for said gearing, a cylinder and suction-operable piston in the casing for controlling said gearing to drive the speedometer at different speed-ratios, a suction-operable device for controlling the two-ratio gearing for driving the axle, valve-means for controlling the suction to said cylinder and to said device, electromagnetic means for controlling the valve-means to shift the piston in opposite directions, and means for manually and selectively controlling the electromagnetic means comprising a manually and selectively operable switch, and a switch controlled by the piston.

12. In control mechanism for a speedometer driven from the propeller shaft of a vehicle equipped with a variable speed transmission selectively controlled by a gear shift lever and suction-controlled two-ratio gearing for driving the axle of the vehicle, the combination of a speedometer and two-ratio gearing driven by said propeller shaft for driving the speedometer, a casing for said gearing, a cylinder and suction-operable piston in the casing for controlling said gearing to drive the speedometer at different speed-ratios, a suction-operable device for controlling the two-ratio gearing for driving the axle, valve-means for controlling the suction to said cylinder and to said device, electromagnetic means for controlling the valve-means to shift the piston in opposite directions, and means for manually and selectively controlling the electromagnetic means comprising a switch manually and selectively operable by the gear shift lever, and a switch controlled by the piston.

13. In control mechanism for a speedometer driven from the propeller shaft of a vehicle equipped with a variable speed transmission selectively controlled by a gear shift lever and driven through a pedal-controlled clutch and suction-controlled two-ratio gearing for driving the axle of the vehicle, the combination of a speedometer and two-ratio gearing driven by said propeller shaft for driving the speedometer, a casing for said gearing, a cylinder and suction-operable piston in the casing for controlling said gearing to drive the speedometer at different speed-ratios, a vacuum-operable device for controlling the two-ratio gearing for driving the axle, valve-means for controlling the suction to said cylinder and to said device, electromagnetic means for controlling the valve-means to shift the piston in opposite directions, and means for manually and selectively controlling the electromagnetic means comprising a manually and selectively operable switch, a switch controlled by the piston, a relay switch, and a switch controlled by the clutch-pedal.

14. A control mechanism for a multi-speed drive axle and automotive drive assembly embodying a clutch, a multi-speed transmission, and a multi-speed axle, power means for shifting said axle; a solenoid for controlling said power means; a primary circuit; switch means operated by the transmission shift lever for closing said circuit only when the clutch pedal is released; a secondary circuit connected to said solenoid means; means controlled by depression of the clutch pedal for closing said secondary circuit; and means for automatically maintaining said primary circuit closed when said clutch pedal is depressed.

15. The control mechanism defined in claim 14, wherein said transmission shift lever is only operable to close said primary circuit when the same is in high gear position.

16. The control mechanism defined in claim 14, wherein said control means for said power means is operable to pre-select the circuits for one axle ratio upon shift of the axle into the other axle ratio.

17. The control mechanism defined in claim 19, wherein said switch means operated by the transmission shift lever comprises an axially shiftable shaft selectively engageable with a pair of gear shifting levers; a rockable switch actuating member pivotally carried by one of said levers; and means for rocking said member when said shaft is engaged with one of said levers and is shifted a predetermined distance toward disengagement.

18. In a power transmitting mechanism, a clutch having a pedal, a selective transmission and a two-speed axle arranged in series; a suction device for shifting said axle from one ratio to the other, valve-means for controlling the suction to said device; electromagnetic means for controlling said valve; a circuit controlled jointly by a selective hand lever and said clutch pedal, operable to energize said suction device and shift said axle from one ratio to the other when said hand lever is actuated and said clutch pedal is depressed, and a second suction device in fluid communication with said valve-means and shiftable substantially simultaneously with said first suction device; and switch means, operated by said second suction device, for establishing a second circuit operable to energize said valve-means and shift said axle from said other ratio to said one ratio upon release and re-actuation of said hand lever and clutch pedal.

19. The mechanism defined in claim 18, wherein said first circuit is made up of two sections, one of which is controlled by a switch which is closed when said clutch pedal is released and opened when the clutch pedal is depressed, and a second section embodying means for maintaining current flow to said electromagnetic means when said clutch pedal is depressed.

20. In a mechanism for controlling two-ratio gearing for driving the axle of a vehicle which is in turn driven by a variable speed transmission selectively controlled by a gear shift lever and a clutch having a pedal; a suction motor for shifting said gearing; valve means for controlling said suction motor; electromagnetic means for controlling the valve means; a selective switch; and circuit means, controlled in part by said clutch pedal, and in part by said selective switch for causing said electromagnetic means to shift said valve means and cause said suction motor to shift said two-ratio gearing alternately from one ratio to the other automatically in response to successive depressions of said clutch pedal when said variable speed transmission is disposed in high gear and said selective switch is closed.

21. The mechanism defined in claim 20, wherein said circuit means comprises a second switch controlled by a second suction motor; and a third switch controlled by said clutch pedal.

22. The mechanism defined in claim 20, wherein said gear shift lever is mounted for movement into a position located slightly beyond high gear position and said selective switch is automatically actuated in accordance with movement of said gear shift lever and is adapted to be closed only when said gear shift lever is moved into said position slightly beyond said high gear position, and said selective switch is maintained in open condition in all other shifted positions of said gear shift lever.

23. The mechanism defined in claim 20, wherein said circuit means comprises a shiftable switch adapted to close one circuit when shifted into one position and operable to close a second circuit when shifted into another position, together with means for causing said switch to automatically shift from one position to the other in accordance with operation of said valve means.

HERBERT C. SNOW.

CERTIFICATE OF CORRECTION.

Patent No. 2,365,732. December 26, 1944.

HERBERT C. SNOW.

It is hereby certified that error appears in the printed specification of the above numbered patent requiring correction as follows: Page 6, second column, line 39, claim 17, for the claim reference numeral "19" read --14--; and that the said Letters Patent should be read with this correction therein that the same may conform to the record of the case in the Patent Office.

Signed and sealed this 8th day of May, A. D. 1945.

(Seal)
Leslie Frazer
Acting Commissioner of Patents.

20. In a mechanism for controlling two-ratio gearing for driving the axle of a vehicle which is in turn driven by a variable speed transmission selectively controlled by a gear shift lever and a clutch having a pedal; a suction motor for shifting said gearing; valve means for controlling said suction motor; electromagnetic means for controlling the valve means; a selective switch; and circuit means, controlled in part by said clutch pedal, and in part by said selective switch for causing said electromagnetic means to shift said valve means and cause said suction motor to shift said two-ratio gearing alternately from one ratio to the other automatically in response to successive depressions of said clutch pedal when said variable speed transmission is disposed in high gear and said selective switch is closed.

21. The mechanism defined in claim 20, wherein said circuit means comprises a second switch controlled by a second suction motor; and a third switch controlled by said clutch pedal.

22. The mechanism defined in claim 20, wherein said gear shift lever is mounted for movement into a position located slightly beyond high gear position and said selective switch is automatically actuated in accordance with movement of said gear shift lever and is adapted to be closed only when said gear shift lever is moved into said position slightly beyond said high gear position, and said selective switch is maintained in open condition in all other shifted positions of said gear shift lever.

23. The mechanism defined in claim 20, wherein said circuit means comprises a shiftable switch adapted to close one circuit when shifted into one position and operable to close a second circuit when shifted into another position, together with means for causing said switch to automatically shift from one position to the other in accordance with operation of said valve means.

HERBERT C. SNOW.

CERTIFICATE OF CORRECTION.

Patent No. 2,365,732. December 26, 1944.

HERBERT C. SNOW.

It is hereby certified that error appears in the printed specification of the above numbered patent requiring correction as follows: Page 6, second column, line 39, claim 17, for the claim reference numeral "19" read --14--; and that the said Letters Patent should be read with this correction therein that the same may conform to the record of the case in the Patent Office.

Signed and sealed this 8th day of May, A. D. 1945.

(Seal)

Leslie Frazer
Acting Commissioner of Patents.